(12) United States Patent
Swann et al.

(10) Patent No.: US 6,870,549 B1
(45) Date of Patent: Mar. 22, 2005

(54) CLUSTER IMAGE PROCESSING THROUGH MERGING OBJECTS (OBJECT DIFFERENTIATION) AND DETERMINATION OF BOUNDARY DATA MEANS OF MULTI-LEVEL (GREYSCALE/ SEGMENTATION) OF DIGITAL IMAGES

(75) Inventors: Robert Edward Meredith Swann, Cambridge (GB); Robert Wei Liang Tan, Herts (GB)

(73) Assignee: Consignia PLC, London (GB)

( * ) Notice: Subject to any disclaimer, the term of this patent is extended or adjusted under 35 U.S.C. 154(b) by 426 days.

(21) Appl. No.: 09/724,181

(22) Filed: Nov. 28, 2000

(30) Foreign Application Priority Data

Jun. 30, 2000 (GB) .............................. 0016222

(51) Int. Cl.[7] .............................. G09G 5/00; G06K 9/34
(52) U.S. Cl. ........................ 345/636; 382/173; 382/180
(58) Field of Search .................... 345/636; 382/173, 382/180, 225

(56) References Cited

U.S. PATENT DOCUMENTS

| | | | | |
|---|---|---|---|---|
| 5,513,277 A | * | 4/1996 | Huttenlocher | 382/171 |
| 5,519,789 A | * | 5/1996 | Etoh | 382/225 |
| 5,740,268 A | * | 4/1998 | Nishikawa et al. | 382/132 |
| 5,859,929 A | | 1/1999 | Zhou et al. | |
| 5,956,468 A | | 9/1999 | Ancin | |
| 6,038,340 A | * | 3/2000 | Ancin et al. | 382/167 |
| 6,044,179 A | | 3/2000 | Savakis | |
| 6,072,904 A | * | 6/2000 | Desai et al. | 382/225 |
| 6,151,424 A | * | 11/2000 | Hsu | 382/294 |
| 6,233,353 B1 | * | 5/2001 | Danisewicz | 382/176 |
| 6,259,827 B1 | * | 7/2001 | Nichani | 382/291 |
| 6,278,446 B1 | * | 8/2001 | Liou et al. | 345/700 |
| 6,536,639 B1 | * | 3/2003 | Frank | 224/257 |

FOREIGN PATENT DOCUMENTS

GB 618 545 A2 10/1994

OTHER PUBLICATIONS

International Search Report mailed Jun. 5, 2002 in PCT/GB01/02946 (3 pages).

Suen, H–M., et al., "Text string extraction from images of colour–printed documents", *IEE Proceedings: Vision, Image and Signal Processing*, Institution Of Electrical Engineers, GB, vol. 143, No. 4 (Aug. 27, 1996), pp. 210–216.

Whichello, A. P., et al., "Fast location of address blocks and postcodes in mail–piece images", *Pattern Recognition Letters*, North–Holland Publ., Amsterdam, NL, vol. 17, No. 11 (Sep. 16, 1999), pp. 1199–1214.

* cited by examiner

*Primary Examiner*—Matthew C. Bella
*Assistant Examiner*—Anthony Blackman
(74) *Attorney, Agent, or Firm*—Flynn, Thiel, Boutell & Tanis, P.C.

(57) ABSTRACT

An image processing system produces clusters of related objects for subsequent analysis. It receives a multi-level digital representation of the image and predetermined objects are identified by extraction units (4). A segmentation unit (6) drives boundary data from the multi-level digital representation, the boundary data representing boundaries between different regions of the image. A clustering unit (8) clusters the predetermined objects into groups in dependence on their proximity to each other and in dependence on the boundary data and supplies this cluster data for subsequent analysis.

20 Claims, 4 Drawing Sheets

FIG. 4(A) ORIGINAL    FIG. 4(B) BACKGROUND
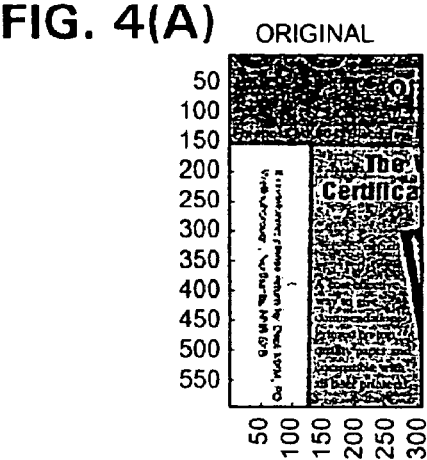 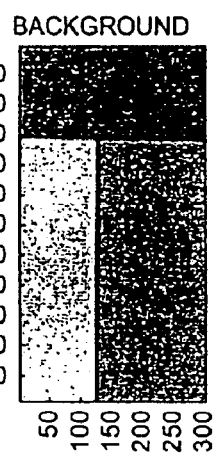
FIG. 4(C) ORIGINAL
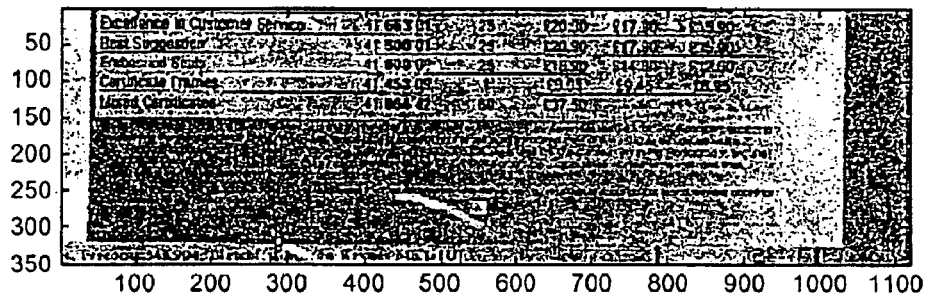
FIG. 4(D) BACKGROUND
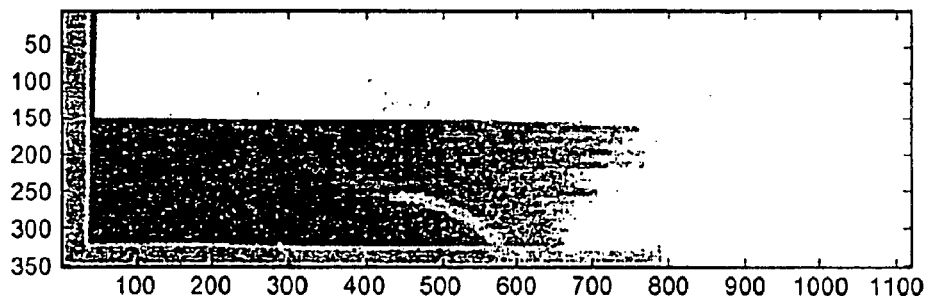
FIG. 4(E) REGION BOUNDARIES
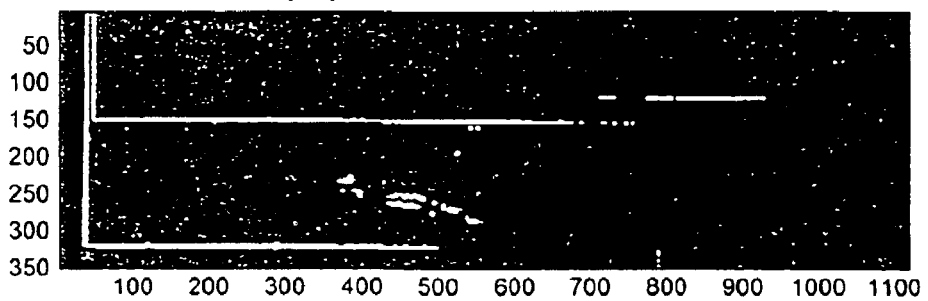

CLUSTER IMAGE PROCESSING THROUGH MERGING OBJECTS (OBJECT DIFFERENTIATION) AND DETERMINATION OF BOUNDARY DATA MEANS OF MULTI-LEVEL (GREYSCALE/ SEGMENTATION) OF DIGITAL IMAGES

FIELD OF THE INVENTION

This invention relates to image processing and is of particular benefit to clustering data in binary images.

BACKGROUND OF THE INVENTION

In a number of image processing applications there is a requirement to cluster objects together, i.e. objects which are related due to their close proximity to each other. For example in document image processing, text objects that are close to each other may be clustered together to form paragraphs. With binary image data this clustering can be performed by merging, i.e. removing gaps between objects that are less than a specified distance limit. The difficulty in merging binary objects into clusters is the determination of the distance limit. If the distance limit is too small then some related objects remain separate. If the distance limit is too large then gaps between clusters may be removed incorrectly.

If the separation between clusters is significantly larger than the gaps between objects within a cluster, then the setting of the distance limit is easy. In the cases where the separation between clusters is similar to the gaps between objects in a cluster, deciding the distance limit for merging is more difficult. If the separation between clusters is smaller than the gaps between objects in a cluster then it may be impossible for a single distance limit to merge objects into clusters without also incorrectly joining clusters together. In the example of text processing of document images, merging text into paragraphs is easy if the separation of the paragraphs is significantly larger than the gap between letters. However if the gap between letters is less than the separation between paragraphs (as is often the case in a document with many fonts and sizes of text), then it may not be possible to cluster all the text into paragraphs successfully using a simple binary merging operation.

In image processing applications where the clustering of binary objects is difficult because of the close proximity of the clusters, it is often helpful to use additional information to segment the binary image. The information used to segment the binary image is generally more useful if taken from a separate source or earlier form of the image. In the example of text processing in document images, the binary image of the text objects may be segmented according to background colour, calculated from the original greyscale image of the document. Unfortunately segmentation of an image can be difficult and many techniques do not adequately account for slowly varying features or incomplete region boundaries.

SUMMARY OF THE INVENTION

We have appreciated that the process of segmenting and merging in order to cluster objects in a binary image may be made more successful and computationally efficient if they are combined into a single process, where the segmentation information is represented as the boundaries between regions. Accordingly a preferred embodiment of the invention clusters together objects in a binary image by removing the gaps between objects in the cases where the gaps are less than a specified distance limit and do not cross a region boundary.

We have observed that the merging of objects in a binary image into clusters can benefit from segmentation of that image. If the segmentation can separate clusters without dissecting them then it reduces the likelihood of incorrectly merging clusters together. This can simplify the requirements of the merging operation making it easier to successfully set a distance limit for the merging. We have also observed that the requirement of merging objects in a binary image into clusters also simplifies the task of segmentation. As an isolated task the segmentation would need to be able to separate the whole image into distinct regions. However the merging operation has a distance limit which will keep clusters that are well separated isolated. Thus the demands on the segmentation are reduced to separating regions where the clusters would otherwise be merged together. The benefit of the invention performing both the merging and segmentation simultaneously is to take advantage of the reduced requirements of the segmentation information and the simplification in the setting of the merging distance limit.

BRIEF DESCRIPTION OF THE DRAWINGS

A preferred embodiment of the invention will now be described in detail by way of an example with reference to the accompanying drawings in which:

FIGS. 4A, 4B, 4C and 4D are depictions of complete and background images scanned according to this invention;

FIG. 4E depicts the border between the background image of FIG. 4D; and

DETAILED DESCRIPTION

In an example of identifying addresses on complex envelopes in a mail processing system there is a requirement to cluster text objects into paragraphs that may be addresses. As with many other image processing applications the merging of binary text objects into paragraphs can benefit from the use of additional information to segment the image. Accordingly in the case of processing document images such as mail we have proposed in our British Patent Application No. GB 2 364 416 A (Corresponding PCT Pub. No. WO 02/03315 A1) filed on the same day as the current application, a method of clustering related text objects in an image document. The aforementioned patent uses two segmentations, one according to text colour and one according to background colour, to segment the binary image of the text objects. In the example shown FIG. 1 the apparatus to identify addresses on complex envelopes, uses a simplified version that creates a segmentation from the background information only.

Figure 1:
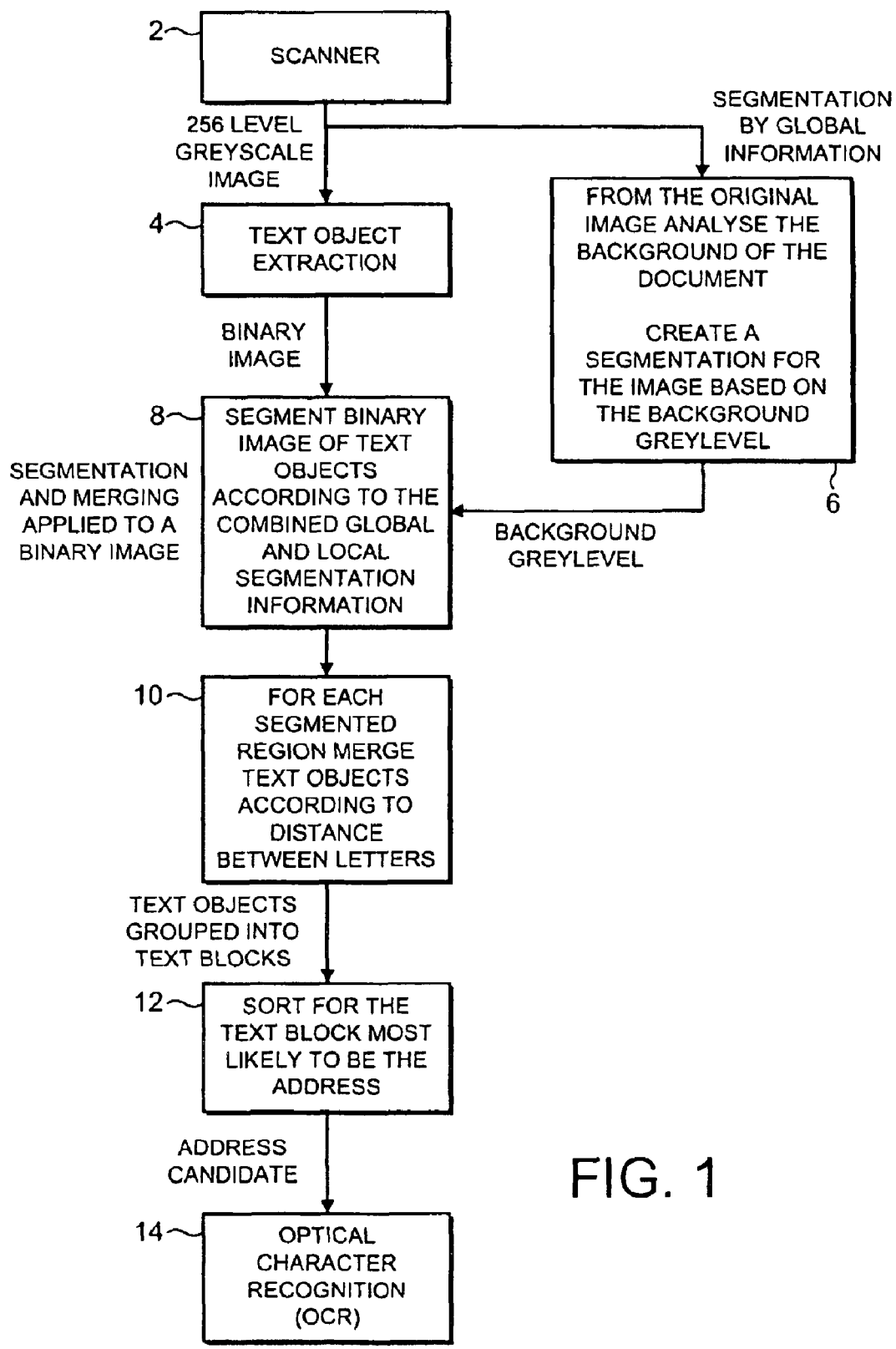
FIG. 1 shows schematically apparatus for identifying addresses on complex envelopes.

In FIG. 1, a scanner 2 produces a 256 level greyscale image from the input document. It could of course produce other resolutions of greyscale image or indeed a colour image. This greyscale image then passes to a text object extraction unit 4 which identifies the text objects in the image and produces a binary image of the text objects.

At the same time, the greyscale image passes to a global information segmentation unit 6 which creates a segmentation for the image based on the background greyscale level by defining regions where the grey level is the same or within a predetermined range. This could also use colour information. This segmentation data relating to background grey level is then passed to a segmentation unit 8 which also receives the binary image from the text object extraction unit 4. Segmentation Unit 8 then segments the binary image of text according to the global background information supplied to it.

The output data from segmentation unit 8 is then passed to the merging unit 10 which, for each segmented region, merges text objects according to the distance between letters. Letters which are separated by less than a predetermined distance are merged together and ones which are further apart are not. This produces text blocks which are passed to a sorting unit 12. This sorts the text blocks according to those most likely to contain an address (in the case of a mail processing system) and passes these to an optical character recognition (OCR) unit 14.

Figure 2:
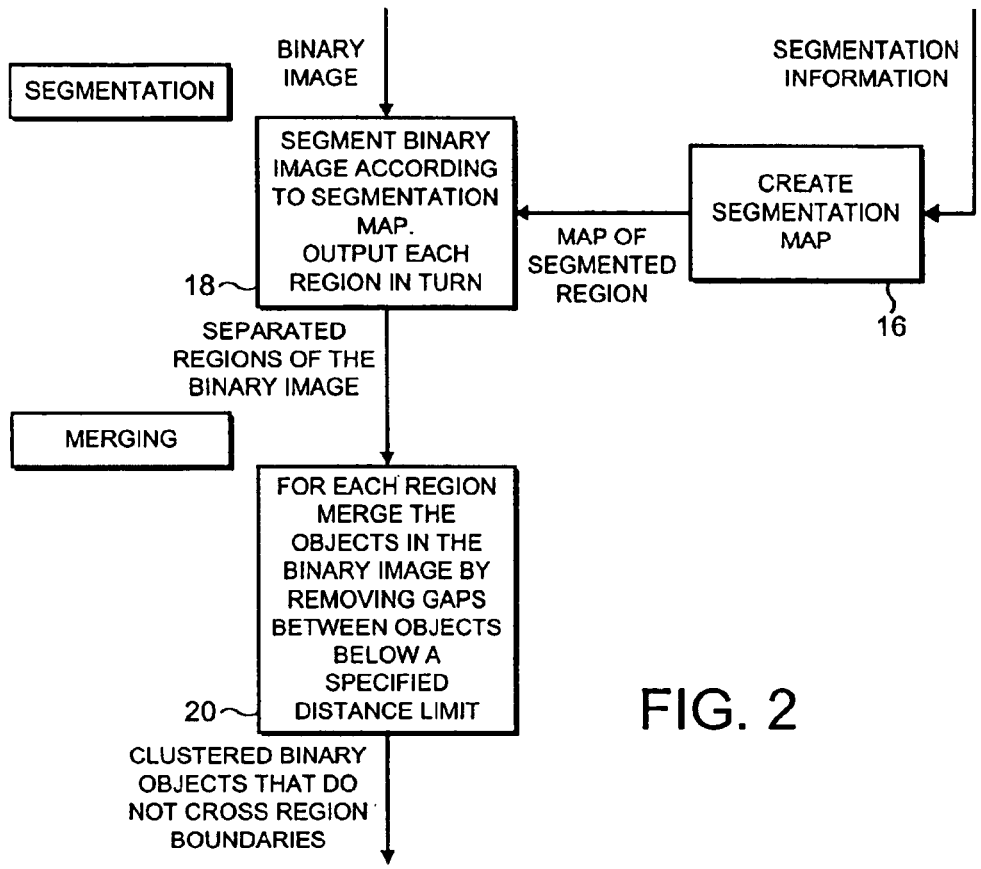
FIG. 2 shows schematically a conventional method for applying both segmentation and merging to a binary image.

Steps 8 and 10 in FIG. 1 are a binary segmentation and merger. A conventional approach to both segmentation and merging of a binary image is shown in FIG. 2. This requires the segmentation to separate the image into complete regions. The merging operation can then be applied to each region separately. In FIG. 2 a segmentation map is created from segmentation information by a segmentation mapping unit 16. This map of segmented regions is combined with the binary image (of text or other objects) in a binary image segmentation unit 18. Binary image segmentation unit 18 outputs, in turn, separated regions of the binary image to a merging unit 20 merging unit 20 removes gaps between objects below a specified distance limit with each region. The output of merging unit 20 is then a sequence of clustered binary objects which do not cross region boundaries. The clusters are constrained by the distance limit of the merging applied. The task of using the segmentation information to separate the image into distinct regions is difficult to do accurately and therefore this system does have drawbacks.

Figure 3:
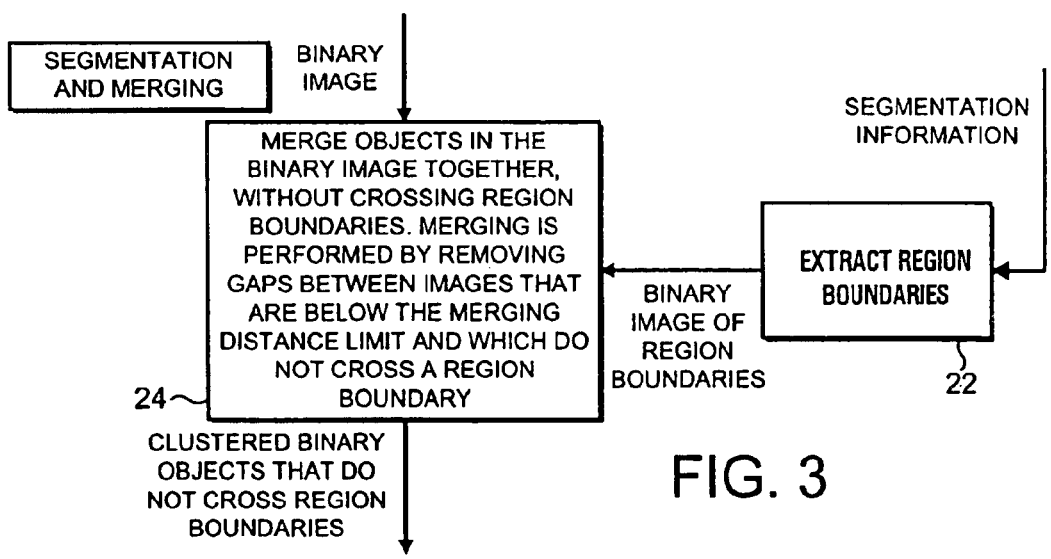
FIG. 3 shows schematically an embodiment of the invention used to perform the tasks of both segmentation and merging on a binary image.

An embodiment of the invention as shown in FIG. 3 is an alternative to this. Instead of attempting to use the segmentation information to separate the image into complete regions, the task is reduced to extracting the region boundaries. Removing gaps between objects in the binary image then performs the merging operation. However, gaps are only removed if they are less than the specified distance limit and do not cross a region boundary. The result is effectively a simultaneous segmentation and merging operation with the advantage that at no point does the image have to be completely segmented. In fact, since the region boundaries do not have to be complete, the process is significantly simpler than forming an isolated segmentation.

The system of FIG. 3 comprises a boundary extraction unit 22 which extracts region boundaries from segmentation information derived from the input greyscale image or some other source. This segmentation information may be information defining changes in background colour or greyscale which exceeds a predetermined limit. This gives a binary image of region boundaries which forms one of the inputs to the merging and segmentation unit 24. The other input to this is the binary image, which in the case of mail processing would come from the text object extraction 25 unit 4 of FIG. 1.

The segmentation and merging unit 24 then merges together objects in the binary image without crossing any region boundaries. Merging is performed by removing gaps between objects that are below the merging distance limit and which do not cross a region boundary. Normally, such a process will be performed by conventional hardware programmed with software to perform this process. However, dedicated hardware circuitry could be provided to implement the segmentation and merging. The benefit of using boundaries for segmentation is illustrated in FIGS. 4A–4E. FIGS. 4A and 4B show the original and background to a document in a mail processing system. In order to aid the clustering of text objects in the paragraphs. The background has been extracted from the original image to segment the binary text objects. This segmentation provided by the background is shown in FIG. 4B. As can be seen, the background areas are obviously distinct and there is no difficulty in separating the image into complete distinct regions according to background.

FIGS. 4C and 4D show original and background of another envelope. The top half of the image is a table of figures and the bottom half has some text. However, the text on the lower section is printed on a background which darkens from right to left. This gradient makes it difficult to segment the image into distinct regions. On the left side, it is clear that the image has upper and lower parts which should be separated. On the right there is no apparent boundary. Complete segmentation would therefore be very difficult. However, region boundaries are simple to extract from the background and give a good accurate representation of where merging can and cannot occur. Thus, the region boundaries can be extracted from the background information and these are illustrated in FIG. 4E. In this, the line dividing upper and lower parts is distinct in the left-hand portion of the image but gradually decreases in distinctness towards the right-hand edge. Using the system of FIG. 3, no merging can take place across this boundary.

A further advantage of this simultaneous merging and segmentation is that, whereas normal segmentation information needs to be able to segment the whole image, in this particular system, it only needs to represent a region boundary. This can be merely a line. It does not need to enclose the distinct region. When used with document image processing, the text objects, the background colour, text colour, text orientation, etc., can all be used to segment the whole image. However, with the current technique, incomplete boundaries such as bold lines, location of images and logos, etc., can all be used successfully to aid clustering of text objects. In addition, repetitive segmentations are normally computationally intensive. The present technique requires only a binary image of the lines not to be crossed during merging. Thus, the multiple segmentations represent a case of Or-ing a number of binary images to create a complete binary image of the region boundaries. This is computationally much less intensive.

Figure 5:
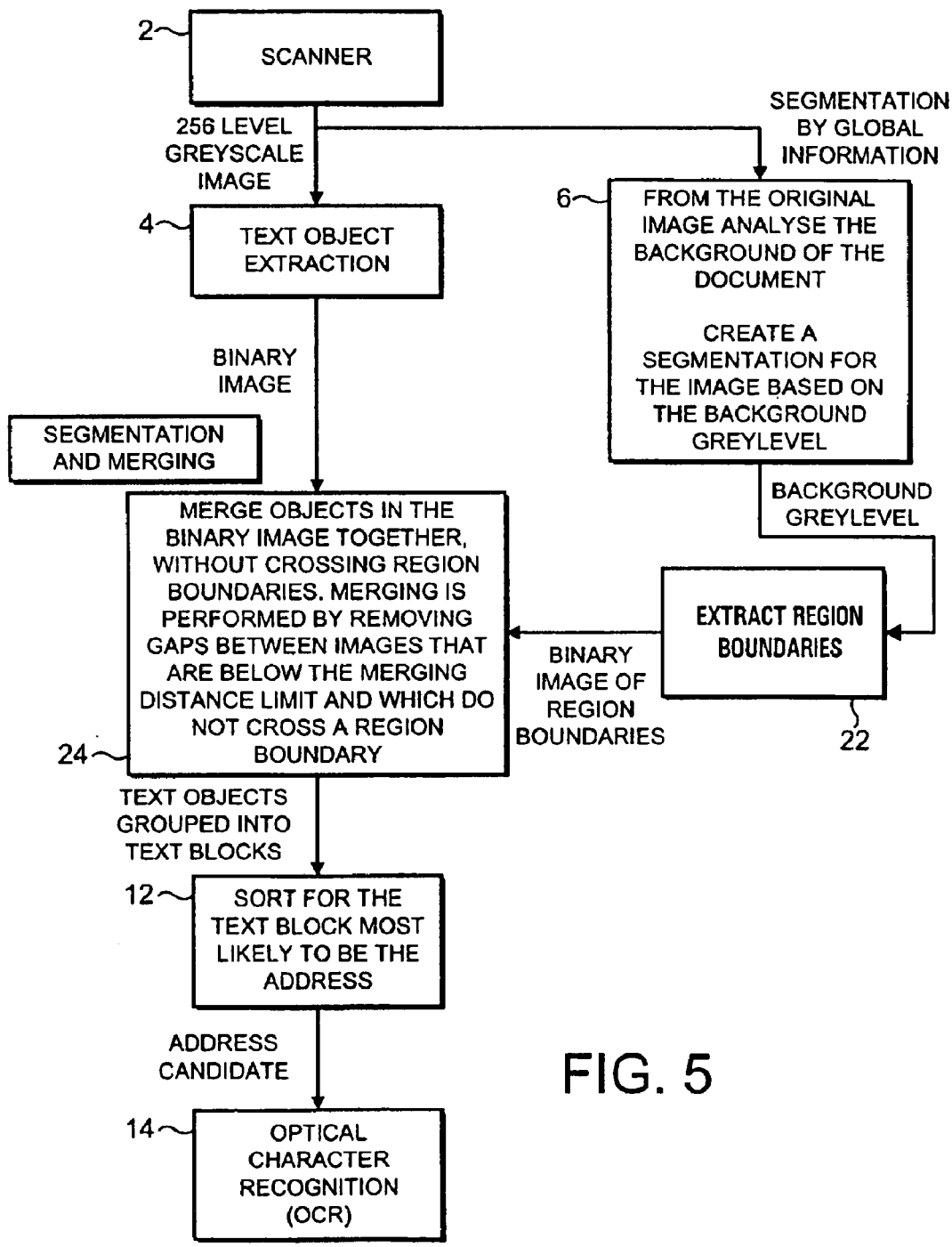
FIG. 5 shows schematically apparatus for identifying addresses on complex envelopes using an embodiment of the invention.

The embodiment shown in FIG. 5 shows the merging and segmentation system of FIG. 3 used in the apparatus of FIG. 1 and replacing the segmentation unit B and the merging unit 10. The segmentation information input to the boundary extraction units 22 comes from the global segmentation unit 6. The binary image input to the merging and segmentation unit comes from the text object extraction unit 4. The output of the segmentation and merging unit 24 is a set of text objects grouped into text blocks. These are then sorted for the text block most likely to be the address by the sorting unit 12 before passing to the OCR 14. The system can easily be implemented to use text colour segmentation instead of greyscale segmentation.

The invention performs the clustering of objects in a binary image where the clusters are described by a maximum distance allowed between objects and by some information that implies segmentation between clusters. The segmentation information is supplied as a binary image of region boundary lines that are not crossed during the clustering operation. The region boundaries do not have to be complete. Since the invention is a general image processing technique for clustering of binary objects there are numerous applications. The main example used in this description has been the clustering of text objects into paragraphs in document images. Other applications could include:

Biological Image Processing E.g.
Clustering binary image of foreign bodies infecting cells, where the segmentation region boundaries are the cell walls.

Geographical Image Processing E.g.
Clustering live stock in images of fields where the region boundaries are the hedge rows.

Image Processing in military applications E.g.
Clustering of personnel in a building, where the binary image of personnel locations may be taken from a thermal imaging system and the segmentation region boundaries are taken as the walls in the building plans.

What is claimed is:

1. An image processing system for producing clusters of related objects within an image for subsequent analysis, said system including:
   means for supplying a multi-level digital representation of an image;
   means for identifying predetermined objects in the image from the multi-level digital representation of the image and supplying data defining the locations of the objects;
   means for deriving boundary data from the multi-level digital representation of the image, the boundary data representing boundaries between regions of the image having different characteristics;
   means for clustering the predetermined objects into groups of related objects as a function of the proximity of the objects to each other and as a function of the boundary data; and
   means for supplying data relating to the groups of objects for subsequent analysis.

2. A method for processing images for producing clusters of related objects within an image for subsequent analysis, said method including the steps of:
   supplying a multi-level digital representation of an image;
   identifying predetermined objects in the image and supplying data defining the locations of the predetermined objects based on the multi-level digital representation of the image;
   deriving boundary data from the multi-level digital representation of the image, the boundary data representing boundaries between regions of the original image having different characteristics; and
   clustering the predetermined objects into groups of related objects as a function of the proximity of the objects to each other and as a function of the boundary data.

3. The image processing system of claim 1, wherein said means for deriving boundary data derives boundary data based on a representation of the image that is different from the representation of the image from which said means for identifying predetermined objects identifies objects and defines the locations of objects in the image.

4. The image processing system of claim 1, wherein said means for deriving boundary data derives boundary data from a source of data containing data representing the image that is different from the source of data containing data representing the image from which said means for identifying predetermined objects identifies objects and defines the locations of objects in the image.

5. The image processing system of claim 1, wherein:
   said means for supplying the multi-level digital representation of the image generates background data representative of the background of the image; and
   said means for identifying boundary data derives boundary data from the background data generated by said means for generating the multi-level digital representation of the image.

6. The image processing system of claim 5, wherein said means for identifying boundary data is configured to derive boundary data from background data that are color data.

7. The image processing system of claim 5, wherein said means for identifying boundary data is configured to derive boundary data from background data that are greyscale data.

8. The image processing system of claim 1, wherein said means for clustering objects clusters objects together that are separated by less than a predetermined distance.

9. The image processing system of claim 1, wherein said means for clustering objects clusters objects together that are separated by less than a predetermined distance and that are not separated by a boundary defined by the boundary data.

10. The image processing system of claim 1, wherein said means for clustering objects clusters objects together that are not separated by a boundary defined by the boundary data.

11. The method of processing an image of claim 2, wherein, in said step of deriving boundary data, the representation of the image from which the boundary data is derived is different from the representation of the image from which, in said step of identifying and locating the predetermined objects, the predetermined objects are identified and located.

12. The method of processing an image of claim 2, wherein, in said step of deriving boundary data, the source of data from which the boundary data is derived is different from the source of data from which, in said step of identifying and locating the predetermined objects, the predetermined objects are identified and located.

13. The method of processing an image of claim 2, wherein:
   in said step of supplying the multi-level representation of the image, background data of the image are supplied; and
   in said step of deriving boundary data, the source of data from which the boundary data is derived is the background data.

14. The method of processing an image of claim 13, wherein, in said step of supplying the multi-level representation of the image the background data that are supplied are color data.

15. The method of processing an image of claim 13, wherein, in said step of supplying the multi-level representation of the image the background data that are supplied are greyscale data.

16. The method of processing an image of claim 2, wherein, in said step of clustering the predetermined objects into groups, objects are clustered together that are separated by less than a predetermined distance.

17. The method of processing an image of claim 2, wherein, in said step of clustering the predetermined objects into groups, objects are clustered together that are separated by less than a predetermined distance and that are not separated by a boundary defined by the boundary data.

18. The method of processing an image of claim 2, wherein, in said step of supplying a multi-level digital representation of the image, an image of a piece of mail is supplied.

19. The method of processing an image of claim 2, wherein, in said step of clustering the predetermined objects into groups, objects are clustered together that are not separated by a boundary defined by the boundary data.

20. The method of processing an image of claim 2, wherein, in said step of supplying a multi-level digital representation of the image, an image of a piece of mail is supplied.

* * * * *